United States Patent
Kamada et al.

(10) Patent No.: US 6,388,675 B1
(45) Date of Patent: May 14, 2002

(54) IMAGE PROCESSING APPARATUS AND IMAGE PROCESSING METHOD

(75) Inventors: Yasunori Kamada; Miki Abe, both of Kanagawa; Eiichiro Morinaga; Takayasu Kon, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/464,960

(22) Filed: Dec. 16, 1999

(30) Foreign Application Priority Data

Dec. 18, 1998 (JP) .......................................... 10-360825
Dec. 7, 1999 (JP) .......................................... 11-347473

(51) Int. Cl.⁷ ............................................... G09G 5/06
(52) U.S. Cl. ...................... 345/600; 345/601; 345/602; 345/603; 345/604; 345/605
(58) Field of Search ................................ 345/600, 601, 345/602, 603, 604, 605, 549, 520, 536, 589, 591, 592, 593, 594, 597

(56) References Cited

U.S. PATENT DOCUMENTS

| | | | | |
|---|---|---|---|---|
| 4,694,406 A | * | 9/1987 | Shibui et al. | 345/684 |
| 5,270,687 A | * | 12/1993 | Killebrew, Jr. | 345/602 |
| 5,412,766 A | * | 5/1995 | Pietras et al. | 345/602 |
| 5,426,448 A | * | 6/1995 | Seal | 345/602 |
| 5,537,579 A | * | 7/1996 | Hiroyuki | 345/601 |
| 5,608,426 A | * | 3/1997 | Hester | 345/600 |
| 5,636,335 A | * | 6/1997 | Robertson et al. | 345/602 |
| 5,949,409 A | * | 9/1999 | Tanaka et al. | 345/549 |
| 6,172,669 B1 | * | 1/2001 | Murphy et al. | 345/601 |

* cited by examiner

Primary Examiner—Michael Razavi
Assistant Examiner—Thu-Thao Havan
(74) Attorney, Agent, or Firm—Frommer Lawrence & Haug LLP; William S. Frommer

(57) ABSTRACT

Picture data composed of a color palette storage address and palette number data is read from memory. On the basis of the color palette storage address, a color palette is taken from among one or more color palettes stored in the memory. The picture data is colored according to the extracted color palette for each piece of the palette number data.

16 Claims, 6 Drawing Sheets

PRIOR ART

FIG.3
PRIOR ART

| PALETTE NUMBER | R | G | B |
|---|---|---|---|
| 0 | 8 bits | 8 bits | 8 bits |
| 1 | | | |
| 2 | | | |
| 3 | | | |
| ⋮ | | | |
| 254 | | | |
| 255 | | | |

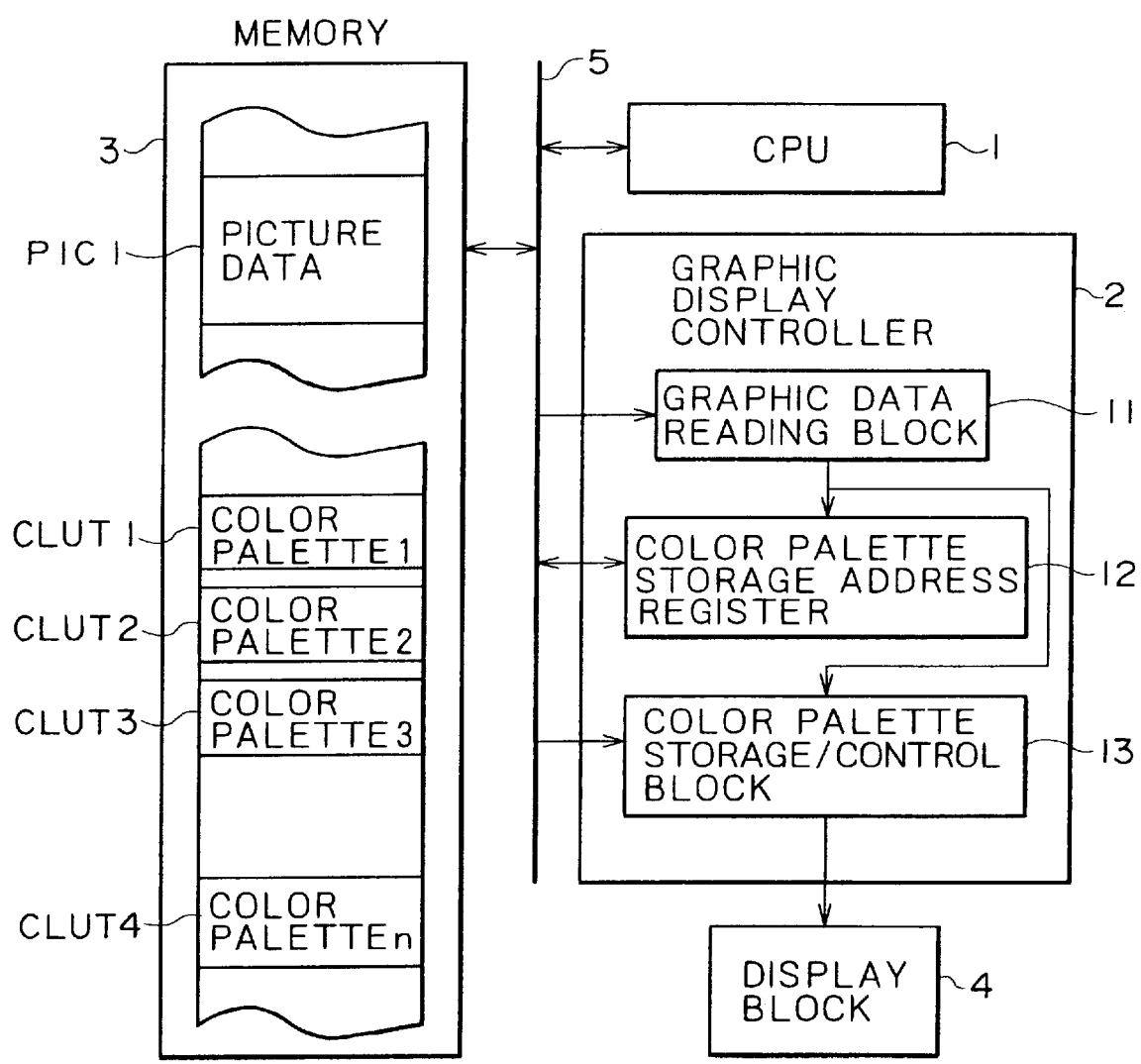

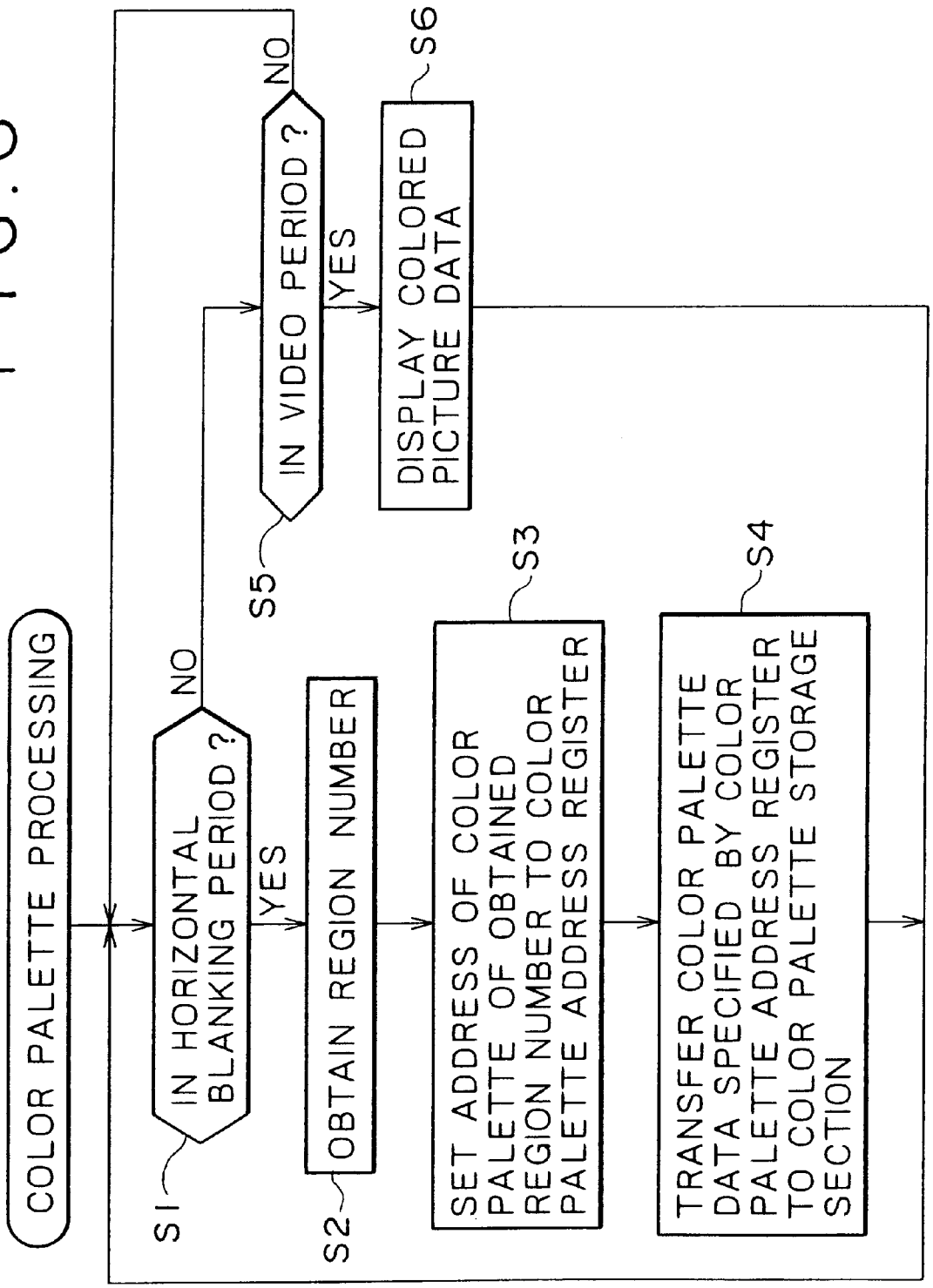

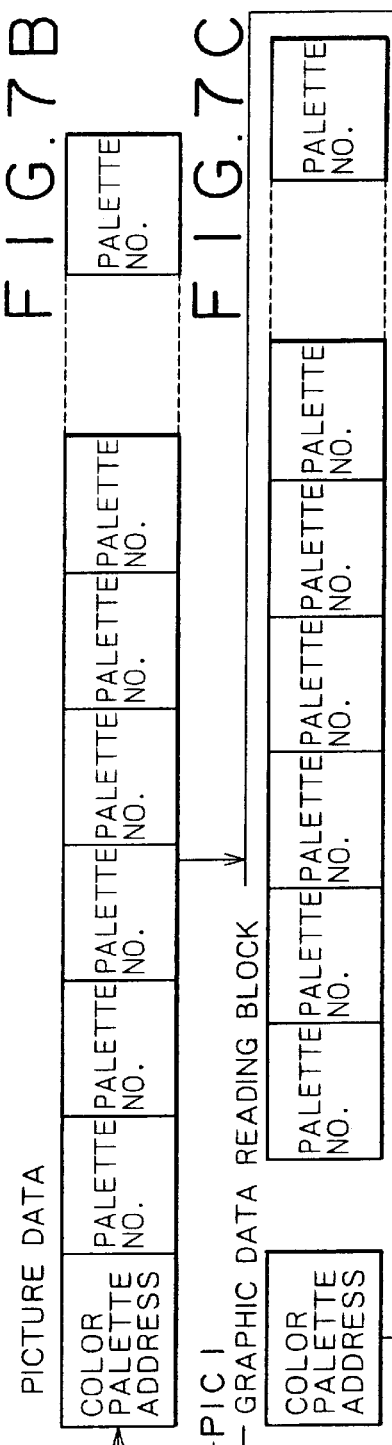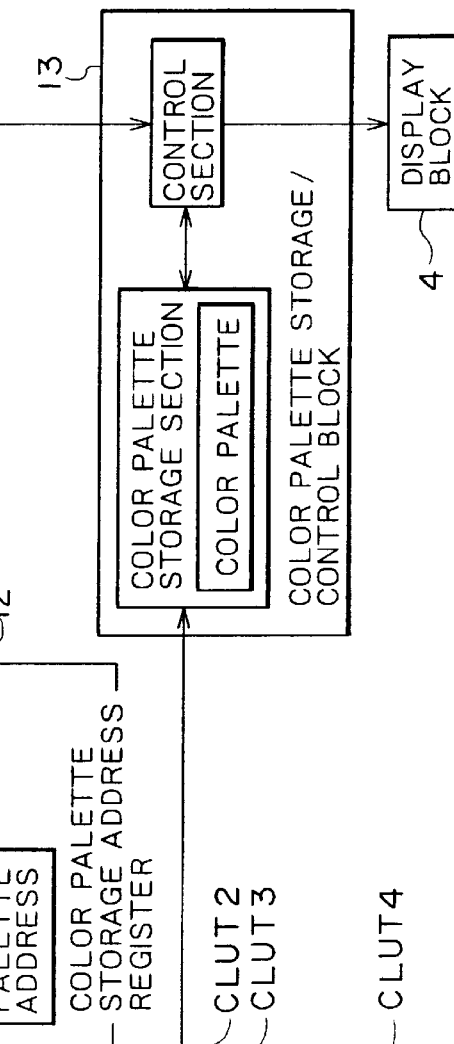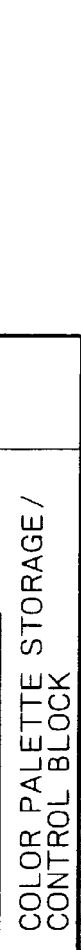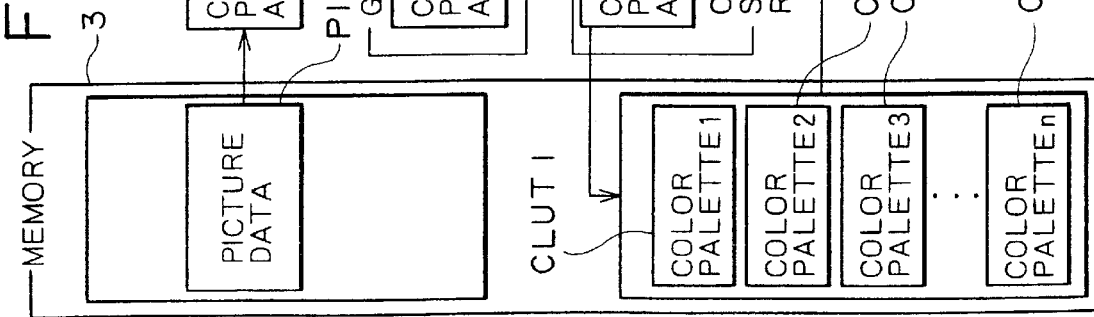

IMAGE PROCESSING APPARATUS AND IMAGE PROCESSING METHOD

BACKGROUND OF THE INVENTION

The present invention relates generally to an image processing apparatus and an image processing method that read from a memory device picture data constituted by color palette storage address and palette number data, selectively extract on the basis of the color palette storage address a color palette from among one or more color palettes stored in the memory device, and color a picture according to the extracted color palette for each piece of the palette number data.

For coloring picture data for display, a so-called color palette technique is used. A color palette is a table of color information consisting R (Red), G (Green), and B (Blue) each of which is made up of 8 bits, for example. The palette number of this color palette corresponds to one dot of picture information. The picture information specifies a palette number and the color information having the specified palette number is read from the color palette. This color information colors a picture for display.

With color palettes, if each of R, G, and B is made up of 8 bits, 256×256×256=16,777,216 colors can be expressed. Because one dot of picture information consists of 8 bits, 256 colors in these 16,777,216 colors can be represented on one display screen.

FIG. 1 shows one example of a related-art image processing apparatus for performing color processing on picture data by use of such color palettes as mentioned above. Referring to FIG. 1, reference numeral 101 denotes a CPU (Central Processing Unit), reference numeral 102 denotes a graphic display controller, and reference numeral 103 denotes a memory.

The memory 103 is provided with a storage area PIC101 for storing picture data. The picture data stored in the storage area PIC101 is represented by 8 bits per dot.

The graphic display controller 102 has a graphic data reading block 111 and a color palette register 112.

The picture data stored in the storage area PIC101 of the memory 103 is transferred to the graphic data reading block 111 over a bus 105. The color palette register 112 holds color palette data. The color palette register 112 performs color processing on the picture data stored in the graphic data reading block 111. The color-processed picture data is then sent to a display block 104 to be displayed thereon.

The picture data stored in the storage area PIC101 of the memory 103 is represented by 8 bits per dot as shown in FIGS. 2A and 2B. Namely, FIG. 2A shows the picture data equivalent to one screen, while FIG. 2B shows the picture data of one dot of the picture data shown on the screen. The one-dot picture data is represented by 8 data bits $D_0$ through $D_7$. The picture data represented by 8 bits per dot is transferred to the graphic data reading block 111 from the storage area PIC101 of the memory 103.

The color palette register 112 stores the color information of R, G, and B, each consisting of 8 bits, totaling to 24 bits. The 8-bit data $D_0$ through $D_7$ allocated to each picture data dot are related to the palette numbers of color palettes.

The color palette register 112 reads the color information of R, G, B according to the picture data stored in the graphic data reading block 111. This performs coloring processing on the picture data. The colored picture data is sent from the graphic controller 102 to the display block 104 to be displayed thereon.

Thus, use of the color palette technique can represent as many as 16 million colors by 8-bit dot information for example. Conventionally, however, of about 16 million colors represented by color palettes, only 256 colors can be displayed on one screen.

In the above-mentioned related-art graphic system, switching between color palettes requires to rewrite the information held in the color palette register 112. One color palette consists of 8 bits of R, G, B each and there are 256 palette numbers. Therefore, the quantity of information stored in the color palette register 112 amounts to 256×8×3=6,144 bits. This requires to rewrite all the information of 6,144 bits stored in the color palette register 112. This causes a problem of burdening the CPU when fast color palette switching is performed.

SUMMARY OF THE INVENTION

It is therefore an object of the present invention to provide an image processing apparatus and an image processing method that enhance the color representation performance on one display screen when performing coloring and displaying picture data by use of color palettes.

It is another object of the present invention to provide an image processing apparatus and an image processing method that perform fast switching between color palettes.

In carrying out the invention and according to one aspect thereof, there is provided an image processing apparatus comprising: graphic data reading means for reading picture data stored in a memory, separating a color palette storage address and palette number data from the picture data, outputting the color palette storage address, and temporarily storing the palette number data to be outputted; color palette storage address holding means for temporarily storing the color palette storage address outputted from the graphic data reading means; and color palette storage/control means for temporarily storing a color palette selectively taken, on the basis of the color palette storage address, from among a plurality of color palettes stored in the memory, reading color data corresponding to the temporarily stored color palette on the basis of the palette number data outputted from the graphic data reading means, and outputting the color data.

In carrying out the invention and according to another aspect thereof, there is provided an image processing apparatus comprising: storage means for storing picture data composed at least of a color palette storage address and palette number data and a plurality of color palettes; graphic data reading means for reading the picture data stored in the storage means, separating the color palette storage address and the palette number data from the picture data, outputting the color palette storage address, and temporarily storing the palette number data to be outputted; color palette storage address holding means for temporarily storing the color palette storage address outputted from the graphic data reading means; and color palette storage/control means for temporarily storing a color palette selectively taken, on the basis of the color palette storage address, from among the plurality of color palettes stored in the storage means, reading color data corresponding to the temporarily stored color palette on the basis of the palette number data outputted from the graphic data reading means, and outputting the color data.

In carrying out the invention and according to still another aspect thereof, there is provided an image processing method comprising the steps of: reading picture data from a memory; separating a color palette storage address and palette number data from said picture data; storing temporarily said color palette storage address and said palette number data; taking selectively a color palette, on the basis of said color palette storage address, from among a plurality of color palettes stored in said memory; holding temporarily said color palette; reading corresponding color data from said temporarily stored color palette for each piece of said temporarily stored palette number data; outputting said color data.

BRIEF DESCRIPTION OF THE DRAWINGS

These and other objects of the invention will be seen with reference to the description, taken in connection with the accompanying drawings, in which:

FIG. 3 is a diagram illustrating a color palette register for use in describing the example shown in FIG. 1;

FIG. 4 is a block diagram illustrating one example of an image processing apparatus to which the present invention is applied;

FIG. 6 is a flowchart for use in describing the example shown in FIG. 4;

FIG. 7A is a diagram illustrating a data configuration of in memory for use in describing the image processing apparatus shown in FIG. 4;

FIG. 7B is a diagram illustrating a picture data format for use in describing the image processing apparatus shown in FIG. 4;

FIG. 7C is a diagram illustrating a graphic data reading block configuration for use in describing the image processing apparatus shown in FIG. 4;

FIG. 7D is a diagram illustrating a color palette storage register configuration for use in describing the image processing apparatus shown in FIG. 4;

FIG. 7E is a diagram illustrating a color palette storage/control block configuration for use in describing the image processing apparatus shown in FIG. 4; and FIG. 7F is a diagram illustrating a display block for use in describing the image processing apparatus shown in FIG. 4.

DETAILED DESCRIPTION OF PREFERRED EMBODIMENTS

Figure 1:
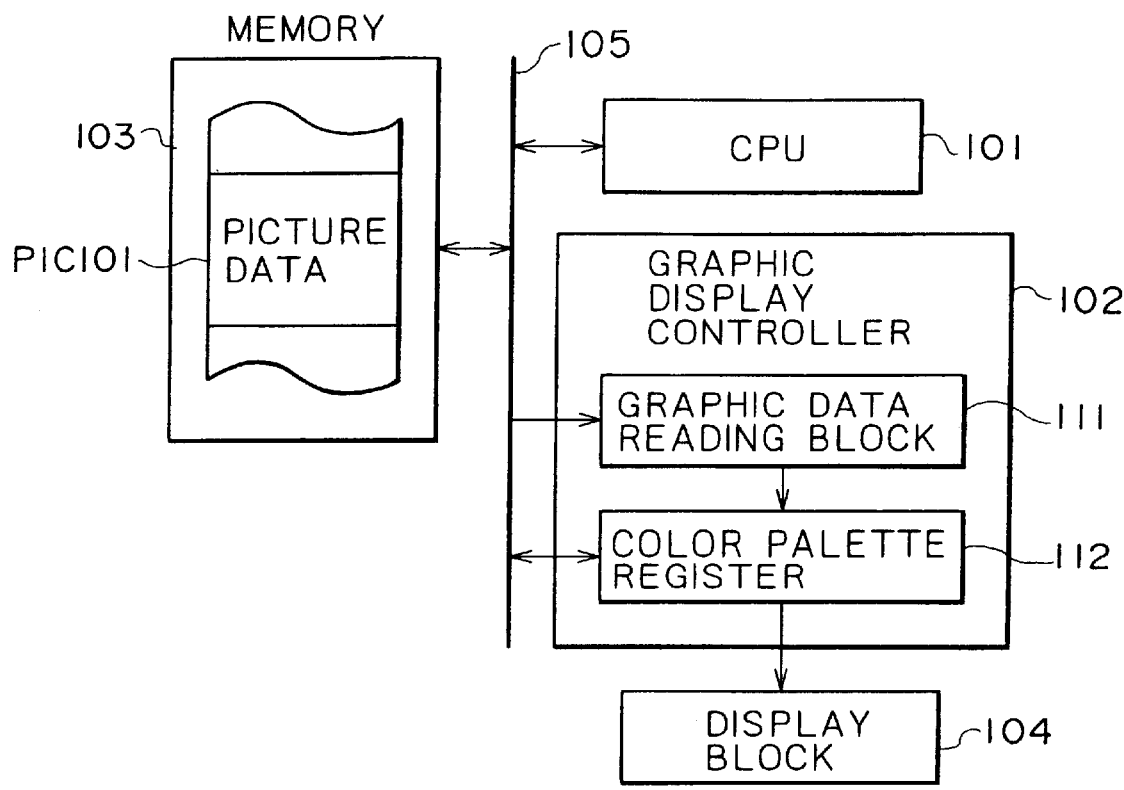
FIG. 1 is a block diagram illustrating one example of a related-art image processing apparatus.
Figure 2A:
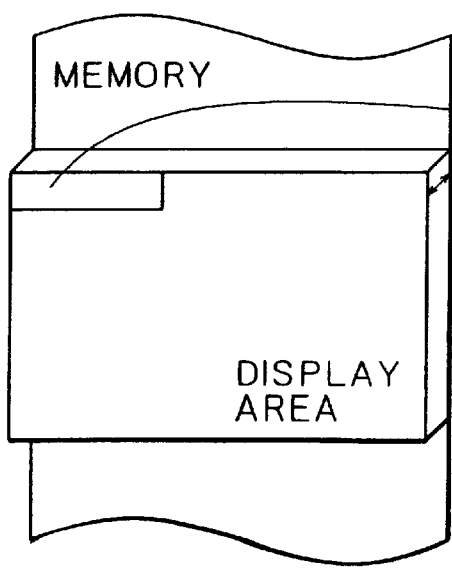
FIG. 2A is a diagram illustrating picture data equivalent to one display screen for use in describing the example shown in FIG. 1.
Figure 2B:
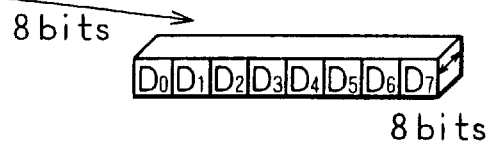
FIG. 2B is a diagram illustrating one-dot picture data for use in describing the example shown in FIG. 2A.

This invention will be described in further detail by way of example with reference to the accompanying drawings. Now, referring to FIG. 4, there is shown one example of an image processing apparatus to which the present invention is applied. In the figure, reference numeral 1 denotes a CPU (Central Processing Unit), reference numeral 2 denotes a graphic display controller, and reference numeral 3 denotes a memory.

A storage area PIC1 for storing picture data is arranged in the memory 3. The picture data stored in the area is represented by 8 bits per dot for example.

The memory 3 is also arranged with color palette data storage areas CLUT1, CLUT2, CLUT3, and so on. These color palette data areas store color palette data. The color palette data are color information of R, G, and B, each consisting of 8 bits, totaling to 24 bits. These color palette data storage areas store different pieces of color palette data.

The graphic display controller 2 has a graphic data reading block 11, a color palette storage address register 12, and a color palette storage/control block 13.

To the graphic data reading block 11, the picture data is transferred from the storage area PIC1 of the memory 3 over a bus 5. Address for specifying the storage areas CLUT1, CLUT2, CLUT3, and so on are set to the color palette storage address register 12. Color palette data are read from the storage areas CLUT1, CLUT2, CLUT3, and so on at the addresses specified by the color palette storage address register 12 and transferred to the color palette storage/control block 13 over the bus 5. The picture data stored in the graphic data reading block 11 are colored on the basis of the color palette data stored in the color palette storage/control block 13. The colored picture data are sent from the graphic display controller 2 to a display block 4 to be displayed thereon.

Thus, the memory 3 has the color palette data storage areas CLUT1, CLUT2, CLUT3, and so on. Each of these storage areas stores different piece of color palette data. When addressing is made by the color palette storage address register 12, the CPU 1 reads the specified address from the color palette storage address register 12. Then, of the color palette data stored in the color palette storage areas CLUT1, CLUT2, CLUT3, and so on, CPU 1 transfers the color palette data addressed by the color palette storage address register 12 to the color palette storage/control block 13. Consequently, simply setting the color palette storage address data 12 can switch between color palettes.

To be more specific, the above-mentioned processing is represented by a data flow as shown in FIGS. 7A through 7F.

The format of the picture data PIC1 stored in the memory 3 shown in FIG. 7A is as shown in FIG. 7B. As shown, the picture data is formed by a color palette address followed by a plurality of color palette numbers.

As shown in FIG. 7C, when the picture data is captured into the graphic data reading block 11, it is separated into the color palette address and 8-bit palette numbers. The separated color palette address is then stored in the color palette storage address register 12 as shown in FIG. 7D. On the basis of the color palette address stored in the color palette storage address register 12, a color palette is selected from color palettes 1 through n stored in the memory 3 as shown in FIG. 7A. The selected color palette is then stored in the color palette storage section of the color palette storage/control block 13 shown in FIG. 7E. According to the palette number stored in the graphic data reading block 11, the controller of the color palette storage/control block 13 takes the corresponding color data from the color palette storage section and outputs the color data to the display block 4 for display thereon.

By use of the above-mentioned image processing apparatus, one display screen can be horizontally divided into a plurality of regions, the color palette data being selected for each region. This enhances the color representation performance.

Figure 5B:
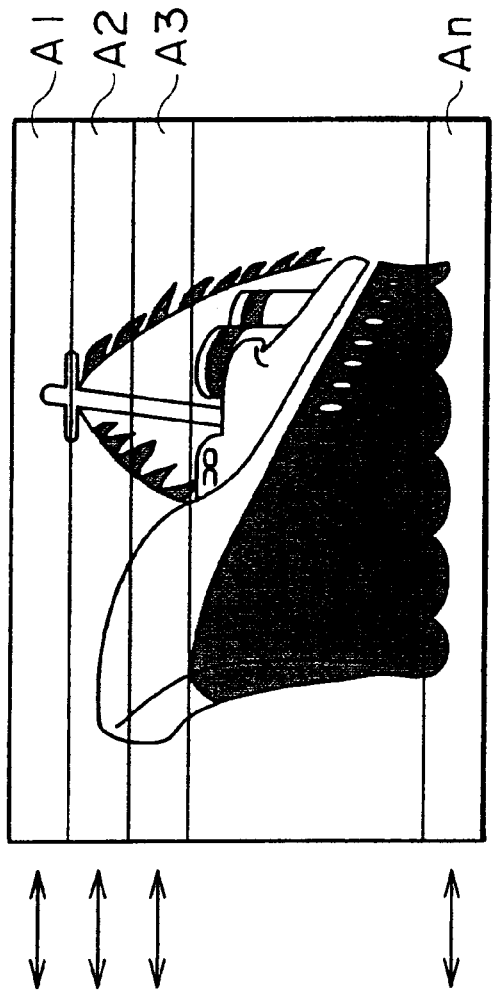
FIG. 5B is a diagram illustrating a relationship between screen regions and color palettes for use in describing the image processing apparatus shown in FIG. 4.
Figure 5A:
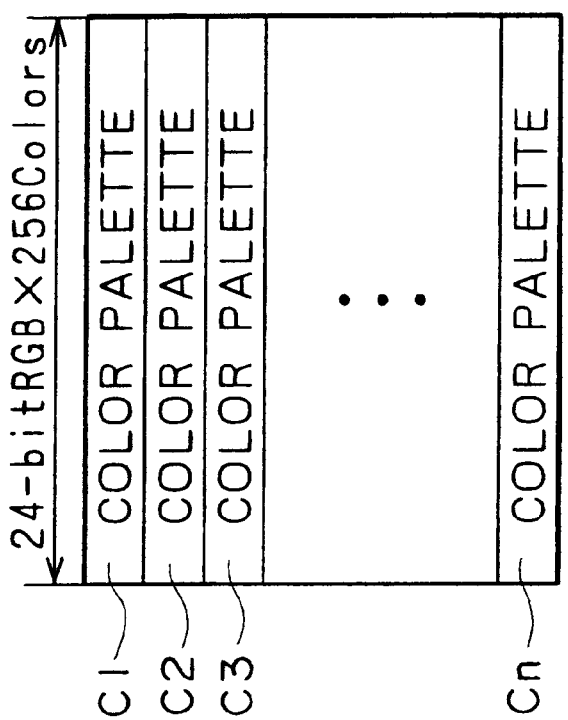
FIG. 5A is a diagram illustrating a color palette configuration for use in describing the image processing apparatus shown in FIG. 4.

For example, assume that the data for one display screen is horizontally divided into a plurality of regions A1, A2, A3, . . . , An as shown in FIG. 5B. Then, n pieces of color palette data C1, C2, C3, . . . , Cn differing from each other are prepared as shown in FIG. 5A. These n pieces of different color palette data C1, C2, C3, . . . , Cn are selectively used for each of the regions A1 through An.

In this case, if the picture data is 8-bit tone data, each of the regions A1 through An can display 256 colors. Since one frame of picture is divided by n, it can represent a total of 256×n colors. Normally, in 8-bit tone picture data, the number of colors that can be represented by one screen is 256. Therefore, switching between plural color palettes in one screen enhances the color representation performance by a factor of n.

In the image processing apparatus shown in FIG. 4, color palette data C1, C2, C3, and so on are stored beforehand in the color palette data storage areas CLUT1, CLUT2, CLUT3, and so on respectively. The value of the color palette storage address register 12 is set for each of the regions A1, A2, A3, and so on according to the color palette data C1, C2, C3, and so on to be used. Thus, one display screen can be horizontally divided into plural regions and the color palette data switching can be performed for each region.

FIG. 6 is a flowchart indicative of the processing to be executed by the graphic display controller 2 when one display screen is horizontally divided into plural regions and the color palette data switching is performed for each region.

Now, referring to FIG. 6, it is determined in step S1 whether horizontal blanking period has been entered in video display.

If the decision is yes, then, in step S2, the region number of the region to be displayed after the currently displayed region is obtained. For example, if the currently display region is A2, the number to be obtained is A3. If the currently displayed region is An, the number of region to be displayed next is A1, which is the top of the regions.

In step S3, on the basis of the region number obtained in step S2, the address of the color palette corresponding to that region is set to the color palette storage address register 12. For example, if the region number obtained in step S2 is A3, the address stored in the color palette CLUT3 is set to the color palette storage address register 12.

In step S4, when the address of the color palette is set to the color palette storage address register 12, the color palette data is read from the storage area in which the color palette data of that address is stored. This color palette data is then sent from the memory 3 to the color palette storage/control block 13 over the bus 5.

The processing returns to step S1 to be continued.

The above-mentioned processing stores the color palette data for use in the screen region to be displayed next into the color palette storage/control block 13 during horizontal blanking period.

If the decision is no in step S1, then it is determined in step S5 whether video period has been entered or not. If the decision is yes, the processing goes to step S6. If the decision is no, the processing returns to step S1.

In step S6, the picture data stored in the graphic data reading block 11 is colored by the color palette data stored in the color palette storage/control block 13. The colored picture data is then displayed on the display block 4.

By the above-mentioned processing, the picture data colored on the basis of the color palette data for use in the screen region to be displayed next stored in the color palette storage/control block 13 during horizontal blanking period is displayed when a video period comes.

Thus, in the image processing apparatus to which the present invention is applied, when the color palette storage address register 12 is set according to the color palette to be used in the screen regions A1, A2, A3, or so on to be displayed next during horizontal blanking period, the picture data for one display screen is divided into the regions A1, A2, A3, and so on. Then the picture data can be colored for each of these regions by use of a different color palette. Consequently, switching between plural color palettes in one display screen can enhance the color representation performance.

In the above examples, one dot is made up of 8 bits. It will be apparent that the present invention is also applicable when the number of bits is other than 8. For example, one dot may be made up of 4 bits.

In the above example, the color of the color palette is represented by R, G, B each being 8 bits wide. It will be apparent that the present invention is also applicable when the number of bits is other than 8. For example, each of R, G, B may be 16 bits wide. As color representation, instead of a component color signal of R, G, B, a component color signal composed of luminance signal Y and color difference signals Cb and Cr may be used.

As described and according to the invention, one display screen is horizontally divided into plural display regions and color palette data are switched for each of the display regions, thereby enhancing the color representation performance. For example, if one display screen is horizontally divided by n and the picture data is 8-bit tone data, 256×n colors can be displayed in one display screen. Conventionally, the number of colors that can be displayed in one display screen is 256 with 8-bit tone, the novel constitution provides the color representation performance that is n times as high as conventional constitutions.

In addition, according to the invention, plural pieces of color palette data are stored on the memory. Addressing these data by use of the color palette address register specifies desired color palette data, which is then stored in the color palette storage section. Consequently, simply setting the color palette address register can switch between color palettes without burdening the CPU 1.

While the preferred embodiments of the present invention have been described using specific terms, such description is for illustrative purposes only, and it is to be understood that changes and variations may be made without departing from the spirit or scope of the appended claims.

What is claimed is:

1. An image processing apparatus comprising:
   graphic data reading means for reading picture data stored in a memory, separating a color palette storage address and palette number data from said picture data, outputting said color palette storage address, and temporarily storing said palette number data to be outputted;
   color palette storage address holding means for temporarily storing said color palette storage address outputted from said graphic data reading means; and
   color palette storage/control means for temporarily storing a color palette selectively taken, on the basis of said color palette storage address, from among a plurality of color palettes stored in said memory, reading color data corresponding to said temporarily stored color palette on the basis of said palette number data outputted from said graphic data reading means, and outputting said color data.

2. The image processing apparatus as claimed in claim 1, wherein said color palette storage/control means stores said color palette during a horizontal blanking period.

3. The image processing apparatus as claimed in claim 1, wherein said graphic data reading means reads said picture data during a horizontal blanking period.

4. The image processing apparatus as claimed in claim 1, wherein the number of colors that said color palette can represent is more than the number of colors specified by said palette number data.

5. The image processing apparatus as claimed in claim 1, wherein said plurality of color palettes are switched between for each of a plurality of display regions obtained by dividing one display screen.

6. The image processing apparatus as claimed in claim 5, wherein said display screen is divided horizontally.

7. An image processing apparatus comprising:
   storage means for storing picture data composed at least of a color palette storage address and palette number data and a plurality of color palettes;
   graphic data reading means for reading said picture data stored in said storage means, separating said color palette storage address and said palette number data from said picture data, outputting said color palette storage address, and temporarily storing said palette number data to be outputted;
   color palette storage address holding means for temporarily storing said color palette storage address outputted from said graphic data reading means; and
   color palette storage/control means for temporarily storing a color palette selectively taken, on the basis of said color palette storage address, from among said plurality of color palettes stored in said storage means, reading color data corresponding to said temporarily stored color palette on the basis of said palette number data outputted from said graphic data reading means, and outputting said color data.

8. The image processing apparatus as claimed in claim 7, wherein said color palette storage/control means stores said color palette during a horizontal blanking period.

9. The image processing apparatus as claimed in claim 7, wherein said graphic data reading means reads said picture data during a horizontal blanking period.

10. The image processing apparatus as claimed in claim 7, wherein the number of colors that said color palette can represent is more than the number of colors specified by said palette number data.

11. The image processing apparatus as claimed in claim 7, wherein said plurality of color palettes are switched between for each of a plurality of display regions obtained by dividing one display screen.

12. The image processing apparatus as claimed in claim 11, wherein said display screen is divided horizontally.

13. An image processing method comprising the steps of:
    reading picture data from a memory;
    separating a color palette storage address and palette number data from said picture data;
    storing temporarily said color palette storage address and said palette number data;
    taking selectively a color palette, on the basis of said color palette storage address, from among a plurality of color palettes stored in said memory;
    holding temporarily said color palette;
    reading corresponding color data from said temporarily stored color palette for each piece of said temporarily stored palette number data; and
    outputting said color data.

14. The image processing method as claimed in claim 13, wherein said steps of reading of said picture data, separating of said color palette storage address and said palette number data, storing of said color palette storage address and said palette number data, taking out of said color palette, and temporarily holding of said color palette are executed all in a horizontal blanking period.

15. The image processing method as claimed in claim 13, wherein the reading and outputting of said corresponding color data from said temporarily stored color palette for each piece of said temporarily stored palette number data are executed in a video output period.

16. The image processing method as claimed in claim 13, wherein the reading of said picture data from said memory is executed for each of a plurality of display regions obtained by dividing one display screens.

* * * * *